Jan. 3, 1956  W. F. STEAGALL  2,729,755
BISTABLE DEVICE
Filed Nov. 19, 1954  4 Sheets-Sheet 1
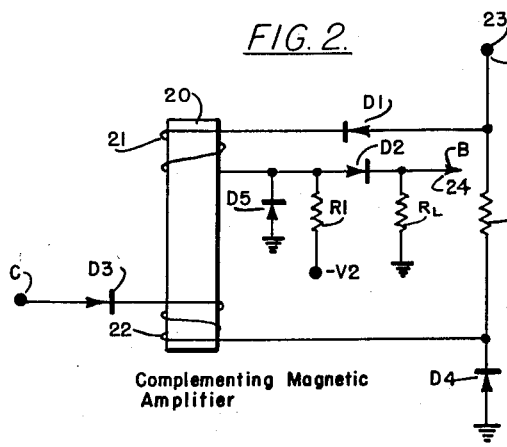
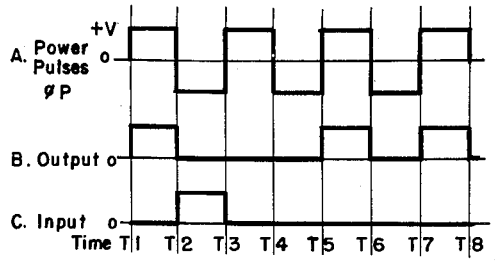
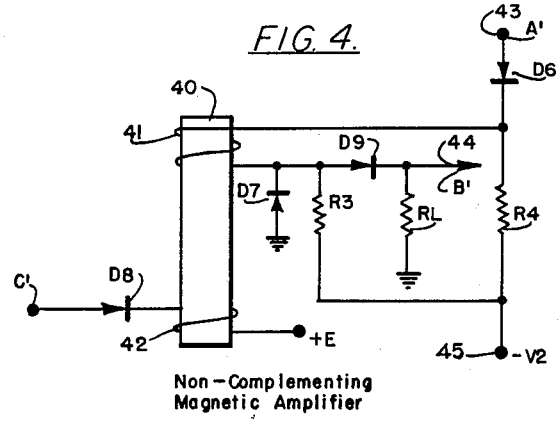
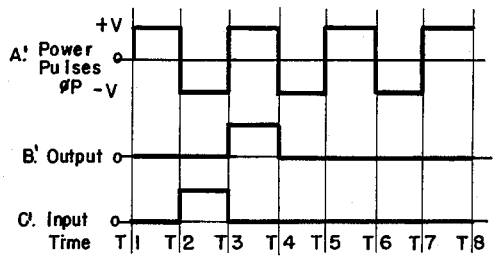
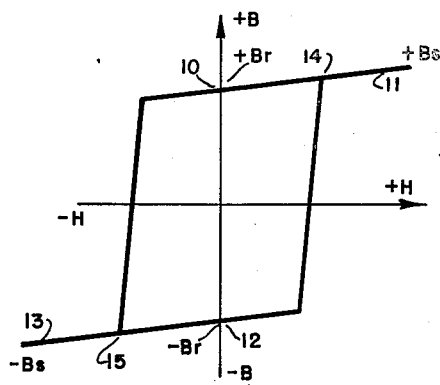
INVENTOR
WILLIAM F. STEAGALL
BY
ATTORNEY Jan. 3, 1956  W. F. STEAGALL  2,729,755
BISTABLE DEVICE Filed Nov. 19, 1954  4 Sheets-Sheet 2

INVENTOR
WILLIAM F. STEAGALL

BY  *E. Jerry Light*

ATTORNEY

Jan. 3, 1956  W. F. STEAGALL  2,729,755
BISTABLE DEVICE
Filed Nov. 19, 1954  4 Sheets-Sheet 3

INVENTOR
WILLIAM F. STEAGALL

BY  *E. Jerry Light*

ATTORNEY

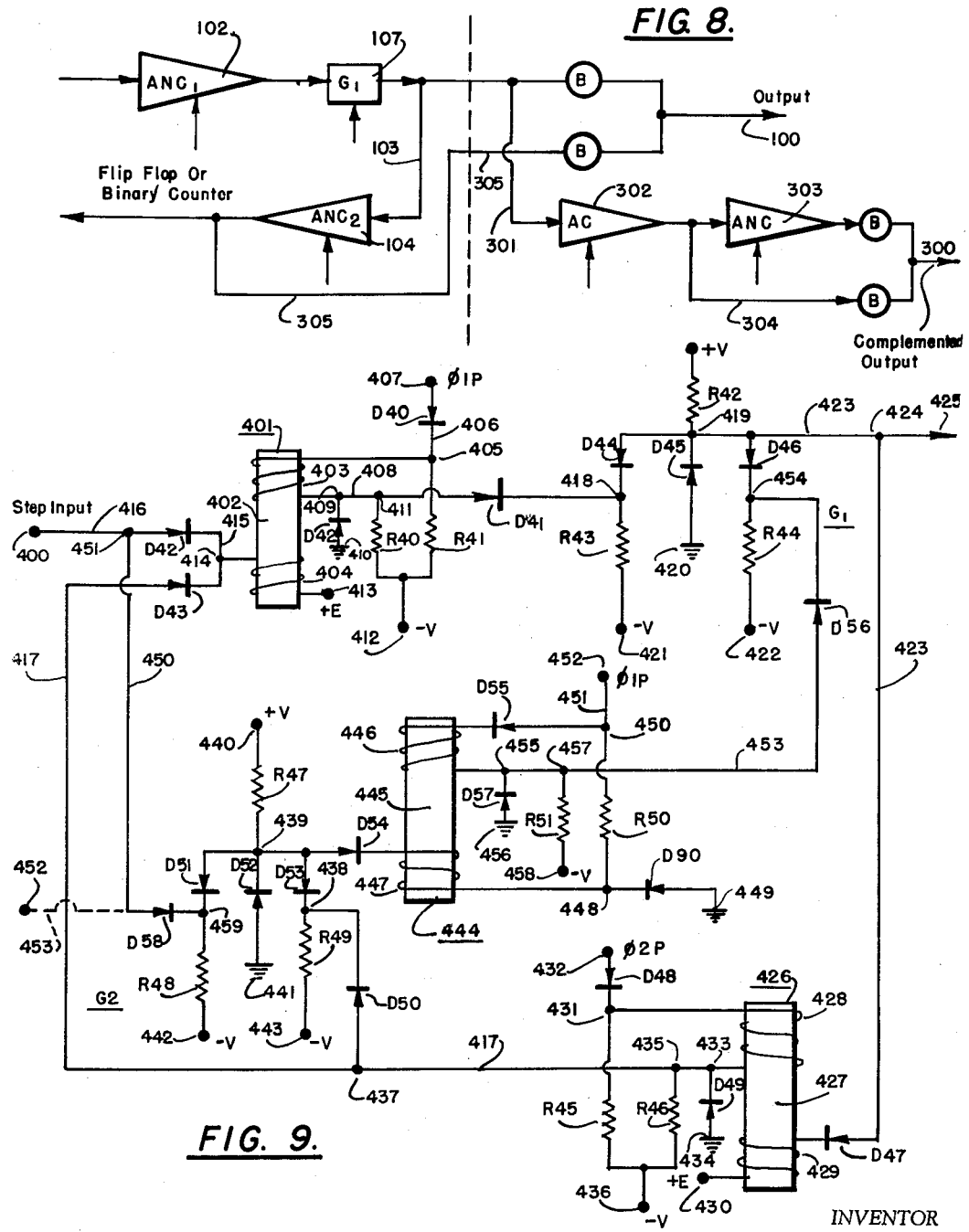

United States Patent Office 2,729,755
Patented Jan. 3, 1956

2,729,755

BISTABLE DEVICE

William F. Steagall, Merchantville, N. J., assignor to Sperry-Rand Corp., a corporation of Delaware Application November 19, 1954, Serial No. 470,096

8 Claims. (Cl. 307—88)

The present invention relates to bistable devices and is more particularly concerned with such devices in the nature of binary counters utilizing magnetic amplifiers.

As is well known, one of the basic components used in computing techniques, for instance, is the bistable device. Such devices may be used as counters, whereby successive input pulses on a single input line will cause the device to regularly change from one stable state of operation to another.

In the past, such bistable devices have normally been constructed in the form of vacuum tube circuitry, and while such circuitry is usually acceptable, it does have several disadvantages. First, the use of vacuum tubes results in a circuit unit which is relatively large in size, thereby making disposition of components within an overall installation rather difficult. Second, vacuum tubes are subject to breakage and as a result circuits utilizing such vacuum tubes are often relatively fragile. Again, in the normal course of operation vacuum tubes are subject to normal operating failures, thus raising serious questions of maintenance and the cost attendant thereto.

Where, as here, reliability of operation is a factor of prime importance, vacuum tubes, even though acceptable for most present-day electronic applications, are faced with accuracy requirements of an entirely different order of magnitude. For example, if two devices each having 99.5% reliability response are both utilized in a combined relationship in a given device, that device will have an accuracy or reliability factor of $.995 \times .995 = 99\%$. If ten such devices are combined, the factor drops to 95.1%. If, however, 500 such units are combined, the reliability factor of the device drops to 8.1%, and for a thousand, to 0.67%. It will thus be seen that even though the reliability of operation of individual vacuum tubes may be very much above 99.95%, where many thousands of units are combined, as in the large computers, the reliability factor of each unit must be extremely high to combine to produce an "error free" device. In practice of course such an ideal can only be approached. Magnetic amplifiers of the type here described meet the necessary requirements of reliability of performance for the combinations discussed.

In order to reduce failures due to the foregoing difficulties, other forms of electrical devices have been suggested for use in bistable circuits. One such other form is the magnetic amplifier and it is with this particular type of bistable device that the present invention is primarily concerned.

It is accordingly a prime object of the present invention to provide a novel bistable device utilizing magnetic amplifiers as the basic components thereof.

A further object of the present invention resides in the provision of a bistable device which is both inexpensive to construct and which exhibits considerable ruggedness.

A further object of the present invention is the provision of a bistable device which can be made in relatively small sizes.

Still another object of the present invention resides in the provision of a bistable device in the nature of a binary counter utilizing magnetic amplifiers.

Still another object of the present invention is the provision of a bistable device in the nature of a counter utilizing plural magnetic amplifiers and an interconnecting network for selectively causing the device to switch from one of its stable states to the other.

The foregoing objects are achieved in the present invention by the provision of a bistable device which comprises two non-complementing magnetic amplifiers. In this respect it should be noted that a non-complementing magnetic amplifier is, by definition, one which will produce an output when an input is applied thereto, and which will, on the contrary, produce no output if an input is not applied.

In one form of my invention the circuit is so arranged that it acts as a counter, namely, it has but a single input line for the reception of step input signals. In another form of my invention two inputs are provided labeled "set" and "reset." The presence or absence of potential at the output of the device indicates to which of the two terminals an input signal was last applied. This form of the invention is termed a "flip-flop."

Before proceeding with the description of my invention, several definitions of the subject matter to be discussed are advisable. The basic term "non-complementing magnetic amplifier" has already been discussed. It should also be mentioned that the invention to be described uses "complementing magnetic amplifiers." Such an amplifier is by definition one which will produce an output signal only in the absence of an input signal. The above complementing and non-complementing amplifiers have been discussed more fully in the copending application of Theodore H. Bonn and Robert D. Torrey, Serial No. 402,858, filed January 8, 1954, for "Signal Translating Device;" and in the copending application of John Presper Eckert, Jr. and Theodore H. Bonn, Serial No. 382,180, filed September 24, 1953, for "Signal Translating Device." Further, the book "High-Speed Computing Devices" by Thompkins, Wakelin and Stiffler, published by McGraw-Hill Book Company, Inc. 1950, will be found to describe uses to which one may put the invention.

The two foregoing applications have been assigned to the assignee of the instant application, and it is to be understood that the present invention may utilize the forms of amplifiers disclosed in the said prior copending applications as well as the particular forms to be described. Other variations will readily suggest themselves to those skilled in the art.

Several other definitions will be of value in the understanding of the present invention. As will be described, the several amplifiers employed in the bistable devices of my invention are energized by "power pulses." These pulses are preferably in the form of regularly occurring positive and negative going square waves. In the disposition of components some amplifier will be fed by "phase 1 power pulses" and this term merely refers to such positive and negative going quare wave pulses as timed with respect to an arbitrary datum. Other of the amplifiers will utilize "phase 2 power pulses" and it is to be understood that this latter term again refers to pulses of the same form as the phase 1 pulses with the sole exception that a positive going portion of a phase 1 pulse occurs during a negative going portion of a phase 2 pulse and vice versa. Again, it will become apparent from the following description that the several power pulses cooperate with input pulses to selectively produce or inhibit an output from the amplifier. These input pulses must ordinarily occur during a negative going portion of the power pulse with which it is to cooperate; and in this respect, therefore, when I speak of a "phase 1 input pulse"

it is to be understood that this term refers to an input pulse occurring during a negative going portion of a phase 1 power pulse, or in brief, an input pulse which may effectively cooperate with a phase 1 power pulse. Similarly, a "phase 2 input pulse" is one which occurs during a negative going portion of a phase 2 power pulse, as will become apparent from the following description. A phase 1 input pulse cannot cooperate with a phase 2 power pulse, nor can a phase 2 input pulse cooperate with a phase 1 power pulse.

The foregoing objects, advantages and operation will become more readily apparent from the following description and accompanying drawings, in which:

Figure 1 is an idealized hysteresis loop of a magnetic material which may preferably be employed in the cores of the magnetic amplifiers utilized in my invention.

Figure 2 is a schematic representation of a simple complementing amplifier of the magnetic type.

Figure 3 (A, B and C) are waveforms illustrating the operation of the complementing magnetic amplifier shown in Figure 2.

Figure 4 is a schematic representation of a basic non-complementing amplifier of the magnetic type.

Figure 5 (A', B' and C') are waveforms illustrating the operation of the non-complementing magnetic amplifier shown in Figure 4.

Figure 8 is a logical diagram of a complementing output for Figures 6 and 7.

Figure 9 is a circuit diagram of one practical form of the invention.

Figure 6:
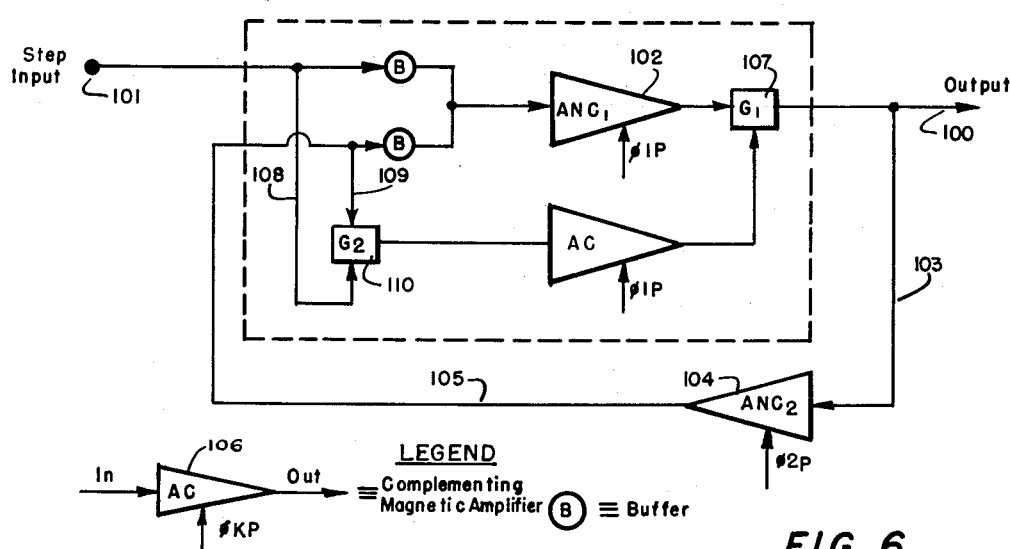
Figure 6 is a logical diagram with a legend of one form of counter according to the invention.

Referring to Figure 1, the magnetic amplifiers of my invention preferably utilize magnetic cores exhibiting a substantially rectangular hysteresis loop. Such cores may be made of a variety of materials, among which are various types of ferrites and various kinds of magnetic tapes, including Orthonik and 4-79 Molypermalloy. These materials may have different heat treatments to give them different desired properties. In addition to the wide variety of materials applicable, the cores of the magnetic amplifiers to be discussed may be constructed in a number of different geometries including both closed and open paths. For example, cup-shaped cores, strips of material, or toroidal cores are possible. It must be emphasized that the present invention is not limited to any specific geometries of its cores nor to any specific materials therefor, and the examples to be given are illustrative only. In the following description bar type cores have been utilized for ease of representation and for facility in showing winding directions. Further, although the following description refers to the use of materials having hysteresis loops substantially as shown in Figure 1, this again is done merely for ease of discussion; and other forms of hysteresis loops may in fact be utilized. Thus, neither the precise core configuration nor core material to be discussed is mandatory and many variations will readily suggest themselves to those skilled in the art.

Returning now to the hysteresis loop shown in Figure 1, it will be noted that the curve exhibits several significant points of operation, namely, point 10 ($+Br$) which represents plus remanence; the point 11 ($+Bs$) which represents plus saturation; the point 12 ($-Br$) which represents minus remanence; and the point 13 which represents minus saturation ($-Bs$); and the points 14 and 15 which represent respectively the beginning of the regions of plus and minus saturation flux density.

Discussing for the moment the operation of a device utilizing a core which exhibits a hysteresis loop such as is shown in Figure 1, let us assume that a coil is on the said core. If we should initially assume that the core is at an operating point 10 (plus remanence), and if a current should be passed through the coil on the said core in a direction such as to produce a magnetizing force in a direction of $+H$, that is in a direction tending to increase the flux in the said core in the same direction, the core will tend to be driven from point 10 ($+Br$) to point 11 ($+Bs$). During this state of operation there is relatively little flux change in the said core and the coil therefore presents a relatively low impedance whereby energy fed to the said coil during this state of operation will pass readily therethrough and may be utilized to effect a usable output. On the other hand, if the core should somehow be "flipped" from point 10 ($+Br$) to point 12 ($-Br$), prior to the application of $a+H$ pulse, upon application of such a pulse the core will tend to be driven from the said point 12 ($-Br$) to the point 14. During this particular state of operation there is a very large flux change in the said core and the coil therefore presents a relatively high impedance to the applied pulse. As a result substantially all of the energy applied to the coil, when the core is initially at $-Br$, will be expended in flipping the core from point 12 to the beginning of the region of plus saturation, point 14, providing the size of the said $+H$ pulse is properly chosen, with very little of this energy actually passing through the said coil to give a usable output. Thus, depending upon whether the core is initially at point 10 ($+Br$) or at point 12 ($-Br$), an applied pulse in the $+H$ direction will be presented respectively with either a low impedance or a high impedance and will effect either a relatively large output or a relatively small output. These considerations are of great value in the construction of the basic magnetic amplifiers such as are shown in Figures 2 and 4.

Referring now to the circuit shown in Figure 2, and making reference to the waveform diagrams of Figure 3 (A through C), it will be seen that a complementing magnetic amplifier provided in accordance with the present invention, comprises a core 20 exhibiting a hysteresis loop preferably similar to that discussed in reference to Figure 1. The core 20 bears two windings thereon, namely, winding 21 which is termed the power or output winding and winding 22 which is termed the signal or input winding. One end of the power winding 21 is coupled to a diode D1, poled as shown; the anode of diode D1 is connected to an input terminal 23 to which terminal is fed a train of positive and negative going power pulses such as is shown in Figure 3A. (The schematic of Figure 2 includes letters A, B and C thereon and these letters refer to points of the circuit wherein the corresponding waveforms shown in Figure 3A through 3C inclusive will appear.) For purposes of the following discussion, the power pulses are shown to have a center value of zero volts and to exhibit excursions between plus and minus V volts. Assuming now that the core is initially at the plus remanence point (point 10 of Figure 1), a positive going power pulse applied at terminal 23 during the time $t1$ to $t2$ will pass through the diode D1, through the relatively low impedance exhibited by power winding 21 and thence through diode D2 to an output point 24. As a result, an output pulse will appear at the terminal 24 during the time $t1$ to $t2$. At the end of the said positive going power pulse at time $t2$, and in the absence of signal inputs, the core will return to the operating point 10 and will remain at the said plus remanence point until a further positive going power pulse applied, for instance, during the time $t3$ to $t4$, will again tend to drive the core to plus saturation. Thus, in the absence of any other inputs, if the core 20 should initially be at plus remanence, successive positive going power pulses will cause successive outputs to appear at output terminal 24, in coincidence with the application of the said positive going power pulses.

Let us now assume, however, that an input pulse is applied during the time $t2$ to $t3$, such as is shown in Figure 3C. This input pulse passes through the diode D3 and through coil 22; and, as will be noted from Figure 2, inasmuch as the said coil 22 is wound in a direction opposite to that of coil 21 the said input pulse will effect a magnetizing force in a $-H$ direction on the core 20. Thus, during the time $t2$ to $t3$, the application of an input pulse as described will tend to cause the core to be flipped in a counter-clockwise direction from the point 10 (plus remanence) to the region of point 13 shown in Figure 1, and preferably to just the beginning of the minus saturation region at point 15; and, at the end of the said input pulse at time $t3$, the core will find itself substantially at the operating point 12 (minus remanence) preparatory to the reception of the next positive going power pulse. This next positive going power pulse, appearing at terminal 23 during the said time $t3$ to $t4$, will therefore find the coil 21 to present a relatively high impedance, and as a result most of the energy presented by the said power pulse will be expended in flipping the core back to the region of point 11 (+Bs), and preferably to point 14 only, rather than in producing a usable output. Thus, as will be seen from an examination of Figure 3, the application of an input pulse during pulses will effectively prevent the output of a usable pulse during the next succeeding positive going power pulse. The system thus acts as a complementer.

Continuing now with the showing of Figure 3, if no input pulse is again applied during the time $t4$ to $t5$, an output pulse will once more appear during the time $t5$ to $t6$. Since the power pulse appearing between time $t3$ to $t4$ caused the core once more to assume its plus remanence operating point, the next positive going input pulse will find the core still to be at this operating point and will again drive the core to plus saturation, giving the desired output.

While the foregoing discussion has described in essence the operation of a complementing magnetic amplifier in accordance with the present invention, several considerations should be noted for proper design of such an amplifier. First of all, the passage of current through coil 21, due to the application of a positive going power pulse at the terminal 23, will cause a small flux change to occur in the core 20 as described if the core is initially at point 10 (+Br), and this flux change will in turn tend to induce a small voltage in the signal coil 22. This induced voltage is negative at the cathode of D3 and positive at the cathode of D4, and although the induced voltage is small it is nevertheless necessary to prevent current from flowing in the lower winding 22 due to this small induced voltage. The combination of resistor R2 and diode D4 accomplishes this function by allowing the lower end of signal winding 22, connected to the junction of the said resistor R2 and diode D4, to attain the potential of the power pulse when the power pulse is positive. Since the base level of an input pulse, as applied through diode D3, is zero volts no current can flow due to the small induced voltage discussed previously.

Again, if the core 20 is initially at $-Br$, point 12, upon application of a positive going power pulse a relatively large flux change occurs in the core and a relatively large voltage of the previously discussed polarity is induced in the lower winding 22. The blocking action of the R2–D4 circuit still prevents current from flowing in the said lower winding 22 due to the said induced potential if there are fewer turns on winding 22 than are on power winding 21. According to principles well known in the art, this relationship between the number of turns on the winding must exist if a voltage gain is to be produced by the amplifier.

Again, it should be noted that when the power pulse shown in Figure 3A is negative going, only a negligible current can flow in diode D1. In this respect it has been assumed that the back resistance of the several diodes shown is infinite and that the forward resistance is zero. While this is not strictly true, these assumptions are convenient and do not substantially effect the explanation. Even though no current flows through the diode D1 during application of a negative going portion of the power pulse, current does flow in the R2—D4 circuit, the magnitude of this current being approximately $$\frac{V}{R2}$$

This current serves to hold the end of signal winding 22 connected to the junction of resistor R2 and diode D4 at approximately ground potential and as a result signal inputs applied through diode D3 during a negative going power pulse portion pass through the said diode D3 and winding 22, as previously discussed, to the junction of resistor R2 and diode D4 which is approximately at ground potential. It must further be noted that the current which flows in winding 22 as the result of an input pulse at the anode of diode D3, must produce sufficient magnetizing force to flip core 20 from plus remanence to minus remanence during the input pulse period. The value of current required to produce the said magnetizing force must not exceed the magnitude $$\frac{V}{R2}$$

but this condition is easily arranged by proper choice of resistor R2. Finally even though the core 20 should initially be at its minus remanence point immediately prior to application of a positive going power pulse (the "no output" state), the said positive going power pulse, in flipping the core from the minus remanence point to the plus remanence point, will still cause a small current to flow through coil 21 and a small output to appear at the terminal 24 as a result. This small output is termed a "sneak output" and should desirably be suppressed. The resistor R1 and diode D5 effect such a sneak output suppression. In this respect the resistor R1 is so chosen that current flows from ground through diode D5, and through the said resistor R1, to a source of potential $-V2$, which current has a magnitude equal to or greater than that of the sneak pulse current to be suppressed. As a result of resistor R1 and diode D5 therefore only outputs substantially larger than the sneak output may appear at output terminal 24.

Summarizing the foregoing briefly, it will be seen that the basic circuitry of Figure 2 provides a complementing magnetic amplifier wherein outputs will appear from the said amplifier so long as no input signal is presented thereto during negative going portions of the power pulses applied; and, on the contrary, upon application of an input pulse during such a negative going power pulse portion no output will occur during the next succeeding positive going portion of the power pulse.

The foregoing design considerations are also present in part in the non-complementing amplifier shown in Figure 4, and their application to the circuit of Figure 4 will be readily apparent to those skilled in the art.

Discussing the basic operation of the device shown in the said Figure 4, therefore, it will be seen that a non-complementing magnetic amplifier in accordance with the present invention utilizes a magnetic core 40, preferably exhibiting a hysteresis loop substantially the same as that shown in Figure 1. This core 40 carries two windings thereon, namely, a power winding 41 and a signal input winding 42, but it should be noted that the signal input winding is reversely wound with respect to winding 22 of the device, as shown in Figure 2. Assuming now that the device is initially at the $-Br$ point seen in Figure 1, application of a positive going power pulse during the time $t1$ to $t2$ at power input terminal 43 will cause a current to flow through the diode D6 and winding 41. Inasmuch as the power pulse energy is for the most part expended in flipping the core from −Br to +Br, only a sneak output, if any, will be present at output terminal 44 and this sneak output is effectively suppressed by the combination of resistor R3 and diode D7. The sneak suppressor circuit R3—D7 is directly analogous to the circuit R1—D5 discussed with reference to Figure 2. Thus, the core initially having been at the minus remanence point, no output pulse appears during the time t1 to t2 due to the application of a positive going power pulse.

Assuming for the moment that no input pulse was applied to the anode of diode D8 during the time t2 to t3, the negative going portion of the power pulse during this time period would cause diode D6 to be cut off. As a result, a reverse current will flow from ground through diode D7, through the said winding 41, thence through resistor R4, to terminal 45 which is connected to a source of negative voltage −V2. Resistor R4 is so chosen that this reverse current flow is sufficient to flip the core from the +Br point back to the −Br point during the t2 to t3 time period. The next positive going power pulse during the time t3 to t4 will therefore once more be expended in merely flipping the core, and again, no usable output will be obtained. If now an input pulse should be applied during the time t2 to t3, coincident with the application of a negative going portion of a power pulse applied at terminal 43, this input pulse will pass current through the diode D8 and through coil 42 whereby a magnetomotive force equal to and in opposition to that produced by the said reverse current flow through coil 41 during this same period will be established. Thus, the application of an input pulse during the time t2 to t3 will effectively neutralize any magnetizing tendency of the reverse current flow through coil 41, and the core 40 will not therefore be flipped to the minus remanence point during this time period. As a result, the next positive going power pulse applied at terminal 43 during the time t3 to t4 will drive the core from plus remanence to plus saturation and will give a usable output at the terminal 44. If no input pulse is present during the time t4 to t5, the reverse current flow through coil 41 during this time again flips the core to the minus remanence point whereby again there will be no output during the time t5 to t6. As will be seen, therefore, the circuit of Figure 4 is in effect a non-complementing type of magnetic amplifier and no usable output will be obtained during a positive going portion of a power pulse unless an input pulse was present during the negative going portion of a power pulse immediately preceding it. The foregoing circuits readily lend themselves to the construction of bistable devices in accordance with the present invention.

Only one additional consideration should be noted in respect to the disposition of components shown in the circuit of Figure 4, and that is that in order to protect the input circuit (connected to the diode D8 to be discussed) against any interference from current flowing in the output winding (41), the signal winding (42) is returned to a positive voltage +E which is equal and opposite in value to the voltage induced or generated in it by current flowing in the power winding 41 when reverse current flows through the said winding 41.

In the following bistable circuits the magnetic amplifiers function as units in the manner described above in cooperation with the rest of the circuit. Figure 6 is a logical diagram of one form of binary counter according to the invention and comprises a half adder circuit, shown within the dashed rectangle, plus a non-complementing feedback magnetic amplifier. In the absence of any output at terminal 100 the application of a step input signal at 101 during the period t2—t3 will cause non-complementing magnetic amplifier 102 to produce an output, as shown by curves O and Q in Figure 6A. As there is no input to complementing magnetic amplifier 106 it will produce pulses as shown at curve S. Since pulses from both amplifiers 102 and 106 arrive simultaneously during period t3—t4 at G1, gate 107, the gate opens and passes a pulse to output 100. This output pulse appears during period t3—t4 and is supplied by wire 103 to non-complementing magnetic amplifier 104 which in turn produces an output, shown on curve R during t4—t5, which is fed back by wire 105 and supplied as input to non-complementing magnetic amplifier 102 which accordingly produces a second output pulse during period t5—t6 as shown on curve Q. In the same way a third output pulse appears at terminal 100 during the period t7—t8.

Figure 6A:
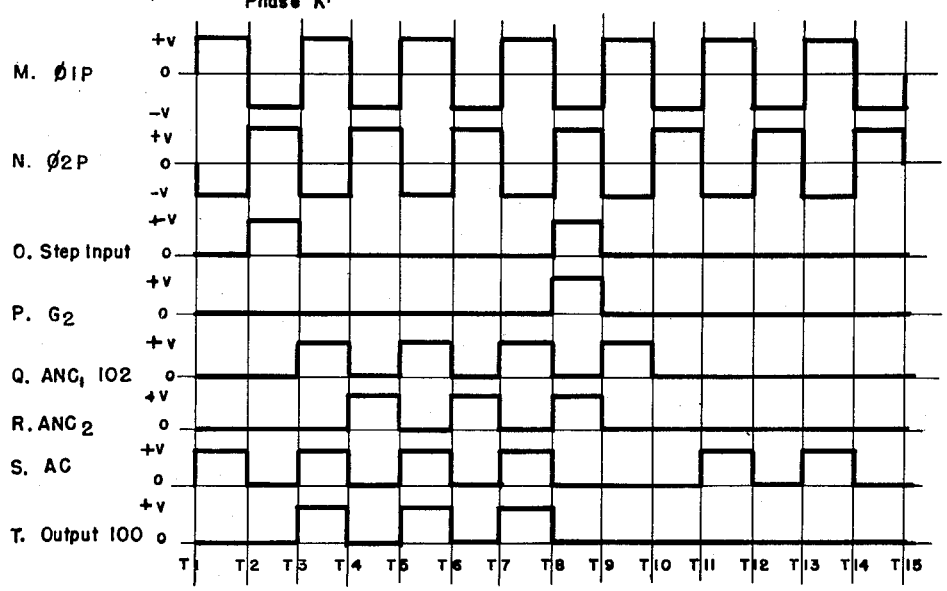
Figure 6A is a waveform diagram for Figure 6.

However, the application of a second input pulse, shown at t8—t9 on curve O of Figure 6A, causes gate G2 to receive simultaneous pulses from wires 108 and 109. The gate G2, 110, opens and supplies a pulse to complementing magnetic amplifier 106 which, as a result, produces no output during the period t9—t10 on curve S. As gate G1 does not receive simultaneous pulses during this period, but only the single pulse from amplifier 102, there is no output during the period t9—t10 at terminal 100.

As a result, there is no input pulse to non-complementing amplifier 104 during period t9—t10 and it therefore does not produce any output during the next interval t10—t11 as shown by curve R. There is thus no input pulse to non-complementing magnetic amplifier 102 which ceases producing output. As shown by curve S, complementing magnetic amplifier 106 begins to produce outputs again, but these are stopped at gate G1. This condition of no output at terminal 100 continues until a third step input is applied to terminal 101 when the cycle repeats. The output from gate 110 may be used as a "carry" output if desired in a digital computer utilizing the binary system.

Figure 7:
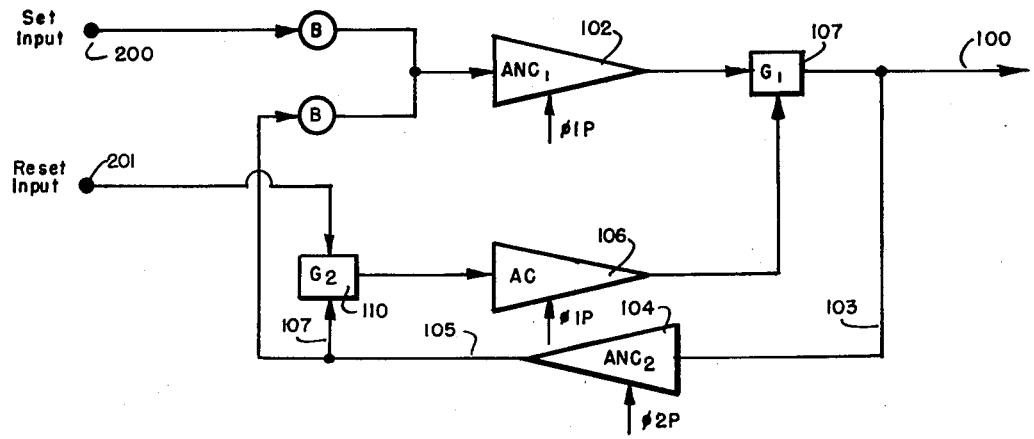
Figure 7 is a logical diagram of another form of the invention.
Figure 7A:
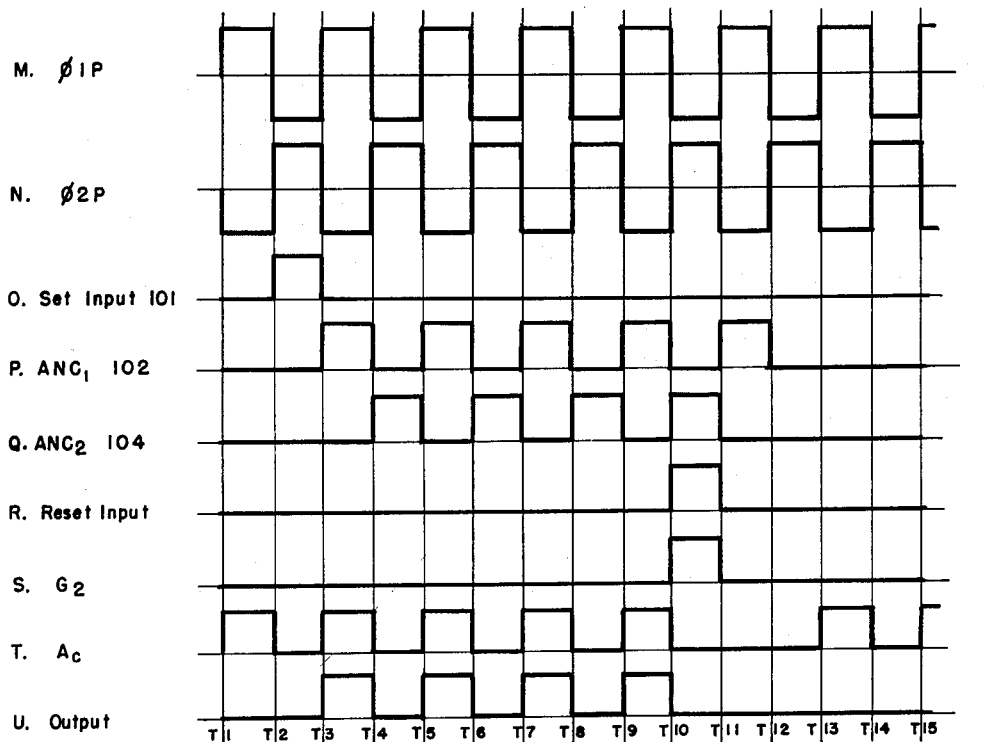
Figure 7A is a waveform diagram representing the operation of Figure 7.

The logical diagram of Figure 7 shows the very simple adaptation required to change Figure 6 from a binary counter to a flip-flop. The sequence of circuit component operation is shown in the curves of Figure 7A. The individual parts are much the same as those of Figure 6 and function in the same general way. The critical difference between the two diagrams is that for Figure 6 the presence of a pulse at terminal 100 indicates that an odd number of pulses has been applied to step input terminal 101 and the absence of a pulse indicates that no pulse at all has been applied to the step input 101, or that an even number has been applied.

With the diagram of Figure 7, however, the presence of a pulse at output terminal 100 indicates that the last signal applied to the device was applied at set input 200 and the absence of any output pulse indicates that the last signal to the device was applied to reset terminal 201. This action is shown by curves O, R and U of Figure 7A, where the set input pulse during the period t2—t3 produces the output signals between t3 and t10. The reset pulse applied to terminal 201 during period t10—t11 stops the output from amplifier 106, closes gate 107 and breaks the pulse train of amplifier 104 and no output appears at output 100 until another set pulse is applied at set terminal 200. Additional pulses at terminal 201 have no effect on the device until after a pulse is applied at terminal 200.

Figure 8 shows a logical diagram for the provision of a complementing output where it is desired to reverse the sense of the output signals for any reason. The circuit portion to the left of the dotted line may be that of either of Figures 6 or 7. An analysis of the circuit will show that whenever there should be a signal at terminal 100 there will not be any signal at terminal 300 and whenever there should not be a signal at terminal 100 a signal appears at terminal 300. If it be assumed that there is a pulse at terminal 100 this pulse will be applied by wire 301 as an input to complementing magnetic amplifier 302 which stops producing an output. As there is no output from non-complementing magnetic amplifier 303 in the absence of a signal from amplifier 302, there can be no signal at terminal 300. When there is no signal at terminal 100 and therefore no input to amplifier 302, it begins to produce output pulses which are supplied both to terminal 300 by wire 304 and to non-complementing magnetic amplifier 303 which begins to produce output pulses. As the pulses of amplifiers 302 and 303 are of opposite phase, a substantially steady potential is maintained at terminal 300. It may be noted that wire 305 supplies the output of amplifier 104 to terminal 100 where it combines with the pulses passed by gate 107 to produce a substantially steady voltage at terminal 100 instead of the pulse trains shown in curve T of Figure 6A and curve U of Figure 7A.

The invention disclosed in the logical diagrams of Figures 6, 7 and 8 may be embodied as one practical form thereof in the circuit diagram of Figure 9 which is presented by way of example only. In Figure 9 a non-complementing magnetic amplifier 401 has a core 402 with a power winding 403 and a signal winding 404. One terminal of power winding 403 is connected to junction 405 with wire 406 leading to the cathode of diode D40, the anode of which is connected to a source of phase 1 ($\phi$1P) power pulses at terminal 407. The other terminal of power winding 403 is connected to wire 408 leading to the anode of diode D41. Wire 408 has a junction 409 connected to the cathode of diode D42, the anode of which is grounded at 410. The wire 408 has another junction 411 connected to one terminal of a resistor R40, the other terminal of which is connected to a source of negative potential —V at terminal 412. A second resistor R41 has one terminal connected to the source of negative potential —V at terminal 41 and its other terminal connected to junction 405 with wire 406.

Signal winding 404 has one terminal connected to a source of positive potential +E at terminal 413 and the other terminal connected to junction 414 with wire 415 leading to the cathodes of diodes D42 and D43. The anode of diode D42 is connected to step input terminal 400 by wire 416. The anode of diode D43 is connected to feedback wire 417.

The cathode of diode D41 is connected to junction 418 with a gate G1 comprising diodes D44, D45 and D46 and resistors R42, R43 and R44. The anodes of diodes D44 and D46 are connected to a junction 419 with one terminal of resistor R42 and the cathode of diode D45. The anode of diode D45 is grounded at 420. The other terminals of resistors R43 and R44 are connected to a source of negative potential —V at terminals 421 and 422, respectively. Junction 419 is connected by wire 423 to the anode of diode D47. The wire 423 contains a junction 424 to which is connected output terminal 425.

Non-complementing magnetic amplifier 426 is provided with a core of suitable magnetic material 427 having a power winding 428 and a signal winding 429 thereon. One terminal of signal winding 429 is connected to the cathode of diode D47 and the other terminal is connected to a source of positive potential +E at terminal 430. Power winding 428 has one terminal connected to junction 431 with the cathode of diode D48 and one terminal of resistor R45. The anode of diode D48 is connected to a source of power pulses of phase 2 ($\phi$2P) at the terminal 432. The other terminal of power winding 428 is connected to feedback wire 417 which contains a junction 433 connected to the cathode of diode D49. The anode of diode D49 is grounded at 434. Wire 417 contains a second junction 435 connected to one terminal of resistor R46. Resistors R45 and R46 each have one terminal connected to a source of negative potential —V at terminal 436. Feedback wire 417 has a junction 437 connected to the anode of diode D50. The cathode of diode D50 is connected to a junction 438 with gate G2. Gate G2 comprises diodes D51, D52 and D53 and resistors R47, R48 and R49. Diodes D51 and D53 have their anodes connected to junction 439 with one terminal of resistor R47, the other terminal of which is connected to a source of positive potential +V at terminal 440. The anode of diode D52 is grounded at 441. Resistors R48 and R49 are connected to a source of negative potential at terminals 442 and 443 and have their other terminals connected to the cathodes of diodes D51 and D53 at junctions 459 and 438, all respectively.

A complementing magnetic amplifier 444 is provided with a magnetic core 445 having a power winding 446 and a signal winding 447. Signal winding 447 has one terminal connected to the cathode of diode D54, the anode of which is connected to junction 439. The other terminal of signal winding 447 is connected to junction 448 with Resistor R50. Junction 448 is connected to the cathode of diode D90, the anode of which is grounded at 449. Resistor R50 has its other terminal connected to junction 450 with wire 451 having a terminal 452 connected to a source of power pulses of phase 1 ($\phi$1P). Power winding 446 has one terminal connected to the cathode of diode D55, the anode of which is connected to junction 450 on wire 451. The other terminal of power winding 446 is connected by wire 453 to the anode of diode D56, the cathode of which is connected to junction 454 of gate G1. Wire 453 contains a junction 455 connected to the cathode of diode D57, the anode of which is grounded at 456. Wire 453 contains a second junction 457 connected to one terminal of resistor R51, the other terminal of which is connected to a source of negative potential —V at terminal 458.

Gate G2 is provided with an input junction 459 connected to the cathode of diode D58. The anode of diode D58 is connected to junction 451 by a wire 450.

The device, as above described, is a binary counter circuit which may be easily altered to a flip-flop circuit by eliminating the connecting wire 450 between junction 451 and the anode of diode D58 and providing a reset input terminal such as 452 connected to the anode of diode D58 by a wire such as wire 453.

The gates G1 and G2 are of a type well known in the art and each requires two simultaneous input pulses to open and permit a pulse to pass. In gate G1 there must be simultaneous input pulses at junctions 418 and 454. In gate G2 there must be simultaneous pulses at junctions 438 and 459. Both gates will block a single pulse.

While there have been described what are at present believed to be the preferred forms the invention may take, it will be understood that other forms may suggest themselves readily to those skilled in the art, in the light of the above disclosure. Generic terminology is employed in the appended claims to include all such equivalents and variations which fall within the true spirit of the invention.

I claim:

1. A bistable device comprising a first non-complementing magnetic amplifier having an input and an output, a gate means, a complementing magnetic amplifier having an input and an output, both said amplifiers having their outputs connected to said gate means, an output for said gate means, a second non-complementing magnetic amplifier having an input connected to the output of said gate and an output connected to the input of said first amplifier, at least one input for the device, a second gate means connected to a device input and the output of said second amplifier, the output of said second gate means being connected as input to said complementing amplifier.

2. The combination set forth in claim 1, said gates being inhibiting gates having two inputs and requiring simultaneous input signals thereon to produce an output signal.

3. The combination set forth in claim 1, a second input for said device, said second gate means being connected to said second input and said first amplifier having its input connected to said first mentioned device input whereby said device comprises a flip-flop.

4. The combination set forth in claim 1, said device input being a single input connected to both said second gate means and said first amplifier whereby said device comprises a binary counter.

5. A bistable device having at least one input and an output, a first magnetic amplifier having an input connected to a device input and an output connected to a gate means, said gate means providing an output for the device, a second magnetic amplifier having an input connected to the output of said gate means and an output connected to the input of said first amplifier, a third amplifier having an output connected to said gate means and a second gate means having its output connected to the input of said third amplifier and an input connected to an input of said device and a source of potential connected to said second gate means.

6. The combination set forth in claim 5, the output of said second amplifier being connected to said second gate and rectifier means isolating each of said amplifier.

7. The combination set forth in claim 5, both said second gate means and said first amplifier being connected to the same input for the device.

8. The combination set forth in claim 5, a second input for the device, said first amplifier having its input connected to one device input and said second gate means being connected to said second device input.

No references cited.